United States Patent [19]

Chan et al.

[11] Patent Number: 5,763,511
[45] Date of Patent: Jun. 9, 1998

[54] ORGANIC PHOTOCHROMIC MATERIALS WITH HIGH REFRACTIVE INDEX, THEIR PREPARATION AND ARTICLES FORMED FROM THESE MATERIALS

[75] Inventors: You-Ping Chan, Lyons; David Henry, Saint-Michel S/Orge; Remy Meyrueix, Lyons; Jacques Jean Vial, Noisy S/Ecole, all of France

[73] Assignee: Corning Incorporated, Corning, N.Y.

[21] Appl. No.: 817,560

[22] PCT Filed: Nov. 9, 1995

[86] PCT No.: PCT/US95/14585

§ 371 Date: Apr. 21, 1997

§ 102(e) Date: Apr. 21, 1997

[87] PCT Pub. No.: WO96/19741

PCT Pub. Date: Jun. 27, 1996

Related U.S. Application Data

[60] Provisional application No. 60/001,677, Jul. 31, 1995.

[30] Foreign Application Priority Data

Dec. 22, 1994 [FR] France ................... 94 15495

[51] Int. Cl.⁶ ................ C08K 5/35; C08K 5/34
[52] U.S. Cl. ............... 524/95; 524/104; 524/110; 252/586

[58] Field of Search ................ 252/586; 524/95, 524/104, 110

[56] References Cited

U.S. PATENT DOCUMENTS 5,585,042 12/1996 Knowles .................. 252/586
5,683,628 11/1997 Mizuno et al. ............ 252/586

FOREIGN PATENT DOCUMENTS

| 0142921 | 5/1985 | European Pat. Off. . |
| 2431511 | 2/1980 | France . |
| 40 10 783 A1 | 10/1991 | Germany . |
| WO-A-92/05209 | 4/1992 | WIPO . |

Primary Examiner—Kriellion S. Morgan
Attorney, Agent, or Firm—Angela N. Nwaneri

[57] ABSTRACT

The invention relates to organic photochromic materials consisting of a polymer matrix of optical quality and of at least one dye that imparts photochromic properties to the matrix, the dye being selected from spirooxazines, spiropyrans and chromenes. The polymer constituting the matrix is a copolymer of 30–95 wt % ethoxylated bisphenol A dimethacrylate and 5–70 wt % of a polyurethane oligomer having terminal di- or triacrylic or di- or trimethacrylic functionality. Such photochromic materials are most suitable for the production of ophthalmic and sun protection lenses.

8 Claims, No Drawings

ORGANIC PHOTOCHROMIC MATERIALS WITH HIGH REFRACTIVE INDEX, THEIR PREPARATION AND ARTICLES FORMED FROM THESE MATERIALS

This application claims the benefit of French Patent No. 94 15495 filed Dec. 22, 1994, and Provisional Application 60/001,677 filed Jul. 31, 1995, both entitled the same as above, by You-Ping Chan, David Henry, Remy Meyrueix and Jacques J. Vial.

FIELD OF THE INVENTION

This invention relates to novel organic photochromic materials with high refractive index and with adjustable properties, a method for their preparation and the articles formed from these materials.

BACKGROUND OF THE INVENTION

Co-assigned, U.S. patent application Ser. No. PCT/US95/14652, titled "Temperature Stable and Sunlight Protected Photochromic Articles," by Florent et al., filed concurrently herewith, discloses transparent organic photochromic materials having high refractive index, formed from a polymer matrix, which matrix can consist of a homopolymer of ethoxylated bisphenol A dimethacrylate having the formula I:

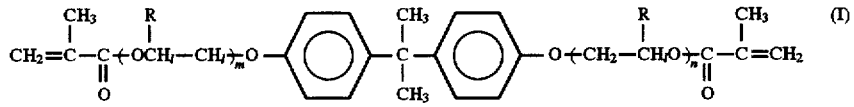

where R=H or $CH_3$, and m and n independently represent 1 or 2, and where optionally, the dimethacrylate is modified up to 30 wt % with an aromatic comonomer with vinyl, acrylic or methacrylic functionality, and where the material contains at least one dye that imparts photochromic properties to the matrix, the dye being selected from spirooxazines, spiropyrans and chromenes.

These materials can be prepared by a method consisting of polymerizing a methoxylated bisphenol A dimethacrylate with the above-mentioned formula I, optionally in the presence of one or more aromatic monomers with vinyl, acrylic or methacrylic functionality, in the presence of a diazo radical initiator, such as azobisisobutyronitrile, and in the absence of a peroxide radical initiator.

Because of the absence of a peroxide initiator, it is possible to incorporate one or more photochromic dyes, selected from spirooxazines, spiropyrans and chromenes, directly into the polymerizable monomer to obtain a matrix which is dyed in bulk. According to the Florent et al. reference, it is also possible to polymerize the polymerizable mixture containing the monomer and the photochromic dye in a lens mold to obtain directly a photochromic lens. In a variant, they also disclose that it is possible to polymerize the monomer without dye and to subsequently dye the matrix obtained (which matrix can be in the form of a lens for example), using photochromic dyes, for example by a method of thermal diffusion, as described in U.S. Pat. Nos. 5,130,353; 5,185,390; and 5,180,254 for example. Typically in a thermal diffusion process, a substrate which is impregnated with one or more photochromic dyes is applied to one side (usually the convex side in the case of a lens) of the polymer matrix, and the mixture is heated at 100°–150° C. for 1 to 3 hours, and finally the substrate is separated from the matrix.

The matrix of the above-mentioned patent application, associated with one or more photochromic dyes, presents essentially constant photochromic characteristics (kinetics, heat dependence). It would be useful to be able to change the photochromic characteristics of the above-mentioned materials in order to better adapt the photochromic material to various applications. Accordingly, it is the object of the present invention to meet this requirement by providing organic photochromic materials having adjustable photochromic properties.

SUMMARY OF THE INVENTION

Briefly, the present invention is directed to organic photochromic materials having adjustable photochromic properties formed by copolymerizing monomers having formula I above with specific polyurethane oligomers.

More specifically, the invention relates to organic photochromic materials consisting of a polymer matrix with optical quality, having a refractive index of at least 1.54 and containing at least one dye that imparts photochromic properties to the matrix, the dye being selected from the group of spirooxazines, spiropyrans and chromenes. The polymer that constitutes the matrix is a copolymer consisting of (i) 30–95 wt % ethoxylated bisphenol A dimethacrylate having the following formula I:

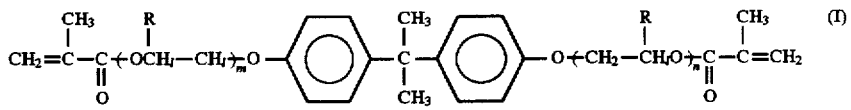

and (ii) 5–70 wt % of a polyurethane oligomer with terminal di- or triacrylic or di- or trimethacrylic functionality.

In another aspect, the invention relates to a method for the preparation of the organic photochromic material by copolymerization of 30–95 wt % of an ethoxylated bisphenol A dimethacrylate having the formula (I):

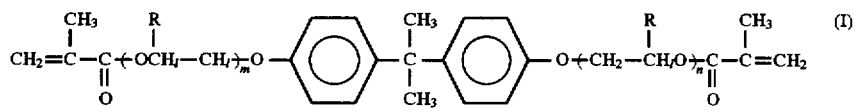

where R=H or CH$_3$, and m and n represent independently 1 or 2, with 5–70 wt % of a polyurethane oligomer with terminal di- or triacrylic or di- or trimethacrylic functionality, in the presence of a diazo radical initiator and in the absence of peroxide radical initiator.

DETAILED DESCRIPTION OF THE INVENTION

The polyurethane oligomer with terminal di- or triacrylic or di- or trimethacrylic functionality can be obtained by reacting a polyol (diol or triol) in the presence of a hydroxylated acrylate or methacrylate with a polyfunctional isocyanate. Oligomers of this type and their preparation are well known in the art and have been described extensively in the literature, for example, in U.S. Pat. Nos. 4,994,208; 5,246,630; and 4,360,653 all herein incorporated by reference.

A polyurethane oligomer can contain in its structure "hard" or "soft" segments, as is well known. As a general rule, polyurethane oligomers with soft segments will decrease the glass transition temperature and the hardness of the polymer material compared to that of the homopolymer matrix without polyurethane oligomer, whereas polyurethane oligomers with hard segments will increase the glass transition temperature and the hardness of the matrix. We have found that these changes in the properties of the polymer matrix allow for the adjustment of the photochromic properties of the material according to the invention. In fact, the kinetics of photochromic darkening and lightening tend to slow down when the glass transition temperature and the hardness of the matrix increase. On the other hand, the heat dependence of the photochromic properties decreases as the glass transition temperature and the hardness of the matrix increase.

The "soft" polyurethanes are derived from linear aliphatic diols such as polycaprolactone diols, polyether diols, polyester diols, associated with cyclic or better linear aliphatic diisocyanates. Examples of soft polyurethanes are described in Polyurethane Handbook, G. Bertel, MacMillan Publishing Co., New York, 1986.

The "hard" polyurethanes are derived from diols with an aromatic character, the presence of aromatic rings being well known to make the structure more rigid and thus increase their glass transition temperature when these diols are reacted with cyclic diisocyanates.

The hydroxylated acrylates and methacrylates used for the preparation of the oligomer can be hydroxyalkyl acrylates or methacrylates or any other hydroxylated acrylate or methacrylate which can give rise to a radical polymerization.

Useful photochromic dyes can be selected from the general classes of spirooxazines, spiropyrans and chromenes which exhibit photochromic properties. A very large number of photochromic dyes have been described in the literature and are available commercially. Lists of useful dyes can be found in the above-mentioned U.S. Pat. Nos. 5,246,630 and 4,994,208 for example. Spirooxazines that can be used are also described in U.S. Pat. Nos. 3,562,172, 4,634,767, 4,637,698, 4,720,547, 4,756,973, 4,785,097, 4,792,224, 4,816,584, 4,831,142, 4,909,963, 4,931,219, 4,936,995, 4,986,934, 5,114,621, 5,139,707, 5,233,038, 4,215,010, 4,342,668, 4,699,473, 4,851,530, 4,913,544, 5,171,636, 5,180,524, 5,166,345 and also in European Patent Nos. 0,508,219 A, 0,232,295 A, and 0,171,909 A, for example. Chromenes that can be used are also described in U.S. Pat. Nos. 3,567,605, 4,889,413, 4,931,22, 5,200,116, 5,066,818, 5,244,602, 5,238,981, 5,106,998, 4,980,089 and 5,130,058, also in European Patent No. 0,562,915 A for example, all herein incorporated by reference.

Useful spiropyrans are described in the literature, for example in *Photochromism*, G. Brown, Editor, Techniques of Chemistry, Wiley Interscience, Vol. III, 1971, Chapter III, pp. 45–294, R. C. Bertelson; and *Photochromism, Molecules & Systems*, Edited by H. Durr, H. Bouas-Laurent, Elsevier, 1990, Chapter 8, "Spiropyrans," pp. 314–455, R. Guglielmetti, both herein incorporated by reference.

As in nonlimiting indication, the proportion of the photochromic dyes to be incorporated in the matrix can range from 0.03 to 0.3%, preferably from 0.05 to 0.1 wt %.

It is also preferred to use a combination of one or more photochromic dyes which yield a gray or brown color in the darkened state.

The invention also relates to a method for the preparation of the novel organic photochromic materials of the invention, characterized by the copolymerization of 30–95 wt % of ethoxylated bisphenol A dimethacrylate having the formula I:

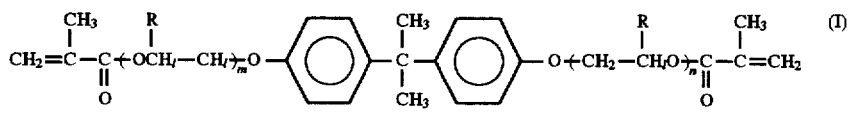

where R is H or CH$_3$, m and n represent, independently of each other, 1 or 2, with 70-5 wt % of a polyurethane oligomer with terminal di- or triacrylic or di- or trimethacrylic functionality, in the presence of a diazo radical initiator and in the absence of a peroxide radical initiator.

It is preferred for R to be H, and m=n=2.

According to a preferred embodiment, the polymerization is conducted, in addition, in the presence of at least one photochromic dye, which allows dyeing the final material in bulk.

One characteristic of the present method is that it is applied in the absence of a peroxide radical initiator, the latter having been replaced by a diazo initiator. This has the advantage of allowing the incorporation of the photochromic dye in the resin matrix for the polymerization of the latter. A polymerization in the presence of dye cannot be carried out by using a peroxide initiator, because the latter then generates a strong initial coloring of the organic glass produced, and even the disappearance of the photochromic effect. The use of a peroxide, as in the method for production of organic glasses currently used, would require the coloring of the glass in a separate subsequent step, example, by high-temperature diffusion of the dyes into the glass matrix. The preferred method of the invention is advantageous in that it allows the elimination of this additional step and it even permits the production of a photochromic lens in a single step if the polymerization is conducted directly in a lens mold.

Naturally, if so desired, the dye can be omitted from the polymerizable mixture and the incorporation of the photochromic dye/dyes in the polymerized matrix can be carried out by a standard method of thermal diffusion as more fully described in U.S. Pat. Nos. 5,130,353, 5,185,390 and 5,180,254 for example.

As diazo radical initiator, azobisisobutyronitrile (AIBN) and 2,2'-azobis(2-methylbutyronitrile) can be used, among others. Other useful diazo radical initiators are described for example in Polymer Handbook, by Bandrup and Immergut, p. II-2, John Wiley (1989) for other examples.

To carry out the polymerization, one can, for example, slowly heat the polymerizable mixture until the thermal degradation of the diazo compound starts with release of nitrogen and free radicals. This can take place at a relatively low temperature, which is a functionality of the diazo compound used (approximately 65° C. in the case of AIBN). The polymerization is carried out for several hours (for examples, 10 to 20 hours). Finally, the structure is baked by heating at successive temperature plateaus which can exceed 100° C. and which last approximately 1 hour each.

The invention finally relates to the articles consisting entirely or in part of the organic 5 photochromic material of the invention. Nonlimiting examples of such articles are lenses for ophthalmic (corrective) eyewear or for sun protection eyewear, window material for cars and other vehicles, window material for buildings, etc. In the articles of the invention, the organic photochromic material can constitute the entire thickness of the article (solid article), or it can be in the form of a film or stratified layer with the transparent, organic or mineral support. Lenses, notably ophthalmic lenses, are the preferred articles of the invention.

These lenses can be produced conveniently by conducting the polymerization in lens molds, by such standard methods as described for example in U.S. Pat. Nos. 2,542,386, 3,136,000 and 3,881,683.

The stratified articles can be produced easily by the application of the polymerizable mixture (for example, by immersion, centrifugation, with a brush, etc.) onto the support, and by in situ polymerization of said mixture.

EXAMPLES

In order to clarify the invention, the following nonlimiting examples are given. The parts are parts by weight.

Example 1 (Reference)

An organic photochromic material is prepared according to the following protocol: to 100 parts by weight of Diacryl 101 (ethoxylated bisphenol A dimethacrylate sold by the company Akzo (formula I,R=H and m=n=1)), 0.5 part by weight of azobisisobutyronitrile (AIBN), as polymerization initiator, and 0.2 part of the photochromic dye is added.

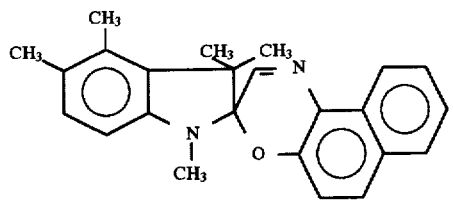

1,3,3,5,6-pentamethylspiro(indolino-2,3'-[3H]naphtho(2,1b)-(1,4)oxazine)
Dye 1

The mixture is polymerized in a lens mold under nitrogen for 16 hours at 65° C.; then the material obtained is baked again for one hour at 70° C., one hour at 80° C. and one hour at 110° C. After removal from the mold, the product is an ophthalmic lens.

Example 2

A polyurethane oligomer with terminal dimethacrylate functionality is prepared as follows: in a reactor heated at 50° C., with stirring and under nitrogen, the following mixture is introduced:

| | |
|---|---|
| Polycaprolactone diol with a molecular weight of 530 | 0.08 mol |
| Hydroxyethyl methacrylate | 0.16 mol |
| Dibutyltin laurate | 0.02 wt % |

After one-half hour, after a reduction of the nitrogen flow, 0.16 mol of isophorone diisocyanate is introduced within approximately one hour, and in this manner the polyurethane with dimethacrylate functionality (PUDMA) is produced.

Example 3

Using the protocol of Example 1, a photochromic lens with blue color is prepared, having the following composition in parts by weight:

| | |
|---|---|
| Diacryl 101 | 90 |
| PUDMA | 10 |
| Photochromic dye 1 (of Example 1) | 0.2 |
| Azobisisobutyronitrile (AIBN) | 0.5 |

Example 4

The protocol of Example 1 is used again, except that the composition, in parts by weight, is as follows:

| | |
|---|---|
| Diacryl 101 | 75 |
| PUDMA | 25 |
| Dye 1 | 0.2 |
| AIBN | 0.5 |

Example 5

The protocol of Example 1 is used again, except that the composition, in parts by weight, is as follows:

| | |
|---|---|
| Diacryl 101 | 50 |
| PUDMA | 50 |

-continued

| | |
|---|---|
| Dye 1 | 0.2 |
| AIBN | 0.5 |

The results obtained, in terms of mechanical properties (Shore hardness, glass transition temperature) and photochromic properties speed of lightening are listed in Table I.

TABLE I

| Example | % PUDMA | Shore D Hardness | Tg (maximum tg δ) | Speed of Lightening* (seconds) |
|---|---|---|---|---|
| 1 | 0 | 87 | 156° C. | 40 |
| 3 | 10 | 87 | 147° C. | 36 |
| 4 | 25 | 86 | 137° C. | 32 |
| 5 | 50 | 83 | 125° C. | 24 |

*Time required to recover a transmission equal to 80% of the initial transmission after exposure for 15 min under a xenon lens (60,000 lux)-Transmission measured at 615 nm-thickness of the sample: 2 mm.

One can see that the use of a soft polyurethane modified comonomer, without changing the mechanical properties too much, improves the kinetics of the photochromic process significantly.

Example 6 (Reference)

Using the protocol of Example 1, a photochromic material of gray color is prepared consisting of a homopolymer of ethoxylated bisphenol A dimethacrylate having the formula (1) with R=H, m=n=2 sold under the name Diacryl by the company Akzo. The composition of the material, in parts by weight, is as follows:

| | |
|---|---|
| Diacryl 121 | 100 parts |
| Dye 1 | 0.2 part |
| Dye 2 | 0.025 part |
| Dye 3 | 0.2 part |

Dye 1 (of Example 1)

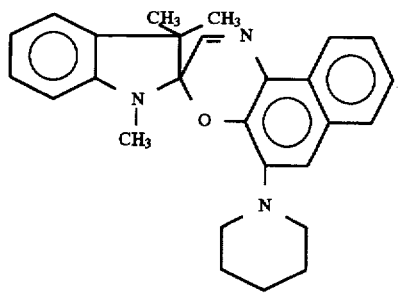

1,3,3-Trimethylspiro(indolino-6'(1-piperidyl)-2,3'-[3H] naphtho-2,1b)(1,4)oxazine)

Dye 3

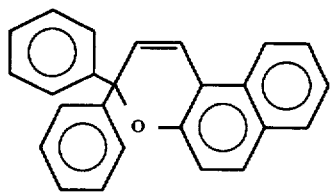

3,3-Diphenyl-3H-naphtho(2,1b)pyran

Example 7

This example illustrates the use of a polyurethane oligomer with trimethacrylic functionality as comonomer.

In a reactor equipped with a mechanical stirrer, an addition funnel, a thermometer and a nitrogen purge and which is completely immersed in a thermostat-regulated bath, the following are introduced:

33.5 g of trimethylolpropane (0.25 mol)

97.6 g of hydroxyethyl methacrylate (0.75 mol)

0.3 g of dibutyltin laurate

The content of the reactor is heated at 50° C. with stirring and under a nitrogen current for 30 min. The nitrogen current is then reduced and 183.2 g (0.75 mol) of tetramethylxylene diisocyanate (TMXDI) are added slowly within one hour.

The mixture is then stirred for one hour, before the addition of:

943 g (1.75 mol) of ethoxylated bisphenol A dimethacrylate (Diacryl 121 of Akzo).

To 20 g of the product obtained above, the following are added:

0.04 g of photochromic compound Dye 1;

0.01 g of photochromic compound Dye 2;

0.04 g of photochromic compound Dye 3;

0.04 g of 2,2'-azobis(2-2-methylbutyronitrile).

After the complete dissolution the mixture is degassed under a vacuum; then it is poured into a lens mold and subjected to one polymerization cycle with a temperature increase from 25° to 80° C. within 16 hours; then it is baked again at 110° C. for 2 hours. The lens obtained is a gray color.

Example 8

This example illustrates the use as comonomer of another polyurethane oligomer with dimethacrylic function. The protocol is identical to that of Example 7, with the use of the following products:

101 g (0.25 mol) of Dianol 240 from Akzo having the formula:

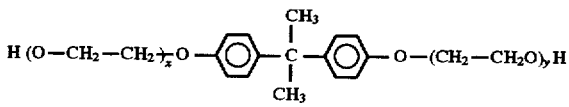

where x+y=4;

65 g (0.5 mol) of hydroxyethyl methacrylate;

111.5 g (0.5 mol) of isophorone diisocyanate;

0.25 g of dibutyltin laurate;

647 g (1.2 mol) of Diacryl 121.

To 20 g of the mixture obtained, the following are added:

0.4 g of photochromic compound Dye 1;

0.01 g of photochromic compound Dye 2;

0.4 g of photochromic compound Dye 3;

0.4 g of 2,2'-azobis(2-2-methylbutyronitrile); and one proceeds as in Example 7.

The properties of the lenses of gray color obtained according to Examples 6, 7 and 8 are indicated in Table II.

TABLE II

| Example | 6 | 7 | 8 |
|---|---|---|---|
| Shore D Hardness | 84 | 86–87 | 86 |
| Glass Transition Temperature | 107° C. | 106° C. | 100° C. |
| Refractive Index $n^D_{20}$ | 1.5575 | 1.5519 | 1.5524 |
| Heat Dependence 25° C. | | | |
| $T_{D15}$ | 24% | 17% | 20% |
| $T_{P5}$ | 66% | 49% | 48% |
| 40° C. | | | |
| $T_{D15}$ | 53% | 42% | 44% |
| $\Delta T_{D15}$ (40° C.–25° C.) | 29 | 25 | 24 |

$T_{D15}$ = % of transmission of 560 nm after 15 min of exposure under a xenon lamp (60,000 lux); thickness of the sample, 2 mm.
$T_{P5}$ = % of transmission of 560 nm after 15 min of exposure and 5 min of lightening in the darkness.

The change of the matrix according to the above examples (7 and 8) allows a reduction of the heat dependence of the photochromic material, which is very important to give the wearer of glasses sufficient protection in warm and sunny weather. Examples 7 and 8 represent the best mode of the invention.

Examples 9–11

As in Example 8, a polyurethane with dimethacrylic functionality is prepared, where instead of using Dianol 240, Dianol 220 from Akzo is used (same formula but with x+y=2).

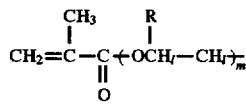
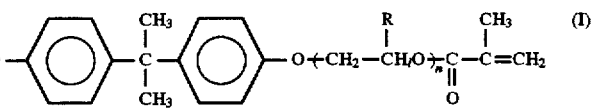

Next increasing quantities by weight of the functionalized polyurethane (10, 20 and 30%) are added to Diacryl 121.

To each composition the same photochromic dyes are added, in the same proportions, as in Example 8, and the polymerization is carried out according to the protocol of Example 8 to obtain lenses of gray color.

The results obtained are indicated in Table III.

TABLE III

| Example | 6 | 9 | 10 | 11 |
|---|---|---|---|---|
| % Polyurethane | 0 | 10 | 20 | 30 |
| Heat Dependence | | | | |
| $T_{D15}$ (25° C.) | 24% | 24.1 | 26.7 | 32.7 |
| $T_{D15}$ (40° C.) | 53% | 49.9 | 47.7 | 47.1 |
| $\Delta T_{D15}$ (40–25° C.) | 29% | 25.8 | 21.0 | 14.4 |

These examples show that the invention allows a reduction of the heat dependence.

We claim:

1. Organic photochromic materials consisting of (a) a polymer matrix of optical quality having a refractive index equal to at least 1.54, and (b) at least one dye that imparts photochromic properties to said matrix, said dye being selected from the group consisting of spirooxazines, spiropyrans and chromenes, said polymer being a copolymer of (i) 30–95 wt % of ethoxylated bisphenol A dimethacrylate having the following formula I:

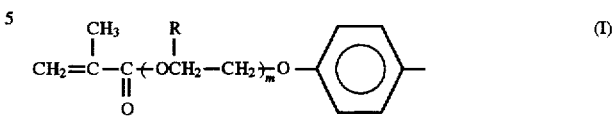
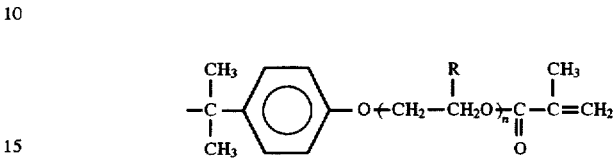

where R=H or CH$_3$, and m and n represent independently 1 or 2, and (ii) 5–70 wt % of a polyurethane oligomer with terminal di- or triacrylic or di- or trimethacrylic function.

2. Photochromic materials according to claim 1, comprising a mixture of two or more photochromic dyes to give the photochromic materials a gray or brown tint in the darkened state.

3. A process for making the organic photochromic material according to claim 1, by copolymerizing (a) 30–95 wt % of an ethoxylated bisphenol A dimethacrylate having the formula (I):

where R=H or CH$_3$, and m and n represent independently 1 or 2, with 5–70 wt % of a polyurethane oligomer having terminal di- or triacrylic or di- or trimethacrylic functionality, and (b) at least one dye that imparts photochromic properties, said dye being selected from the group consisting of spirooxazines, spiropyrans and chromenes; said copolymerizing step being carried out in the presence of a diazo radical initiator and in the absence of peroxide radical initiator.

4. The process according to claim 3, characterized in that, in formula (1), R=H and m=n=2.

5. The process according to claim 3, characterized in that the polymerization is carried out in the presence of at least one photochromic dye selected from the group consisting of spiropyrans, spirooxazines and chromenes.

6. The process according to claim 3, further comprising the step of incorporating at least one photochromic dye into the polymer matrix by thermal diffusion of said dye into the matrix following the polymerization step.

7. Photochromic articles comprising the transparent organic photochromic material according to claim 1.

8. Article according to claim 7, characterized in that said article is a lens.

* * * * *